Aug. 10, 1926. Re. 16,400
W. FERRIS ET AL
ROPE THRUSTING SHOVEL
Original Filed March 24, 1921 3 Sheets-Sheet 1
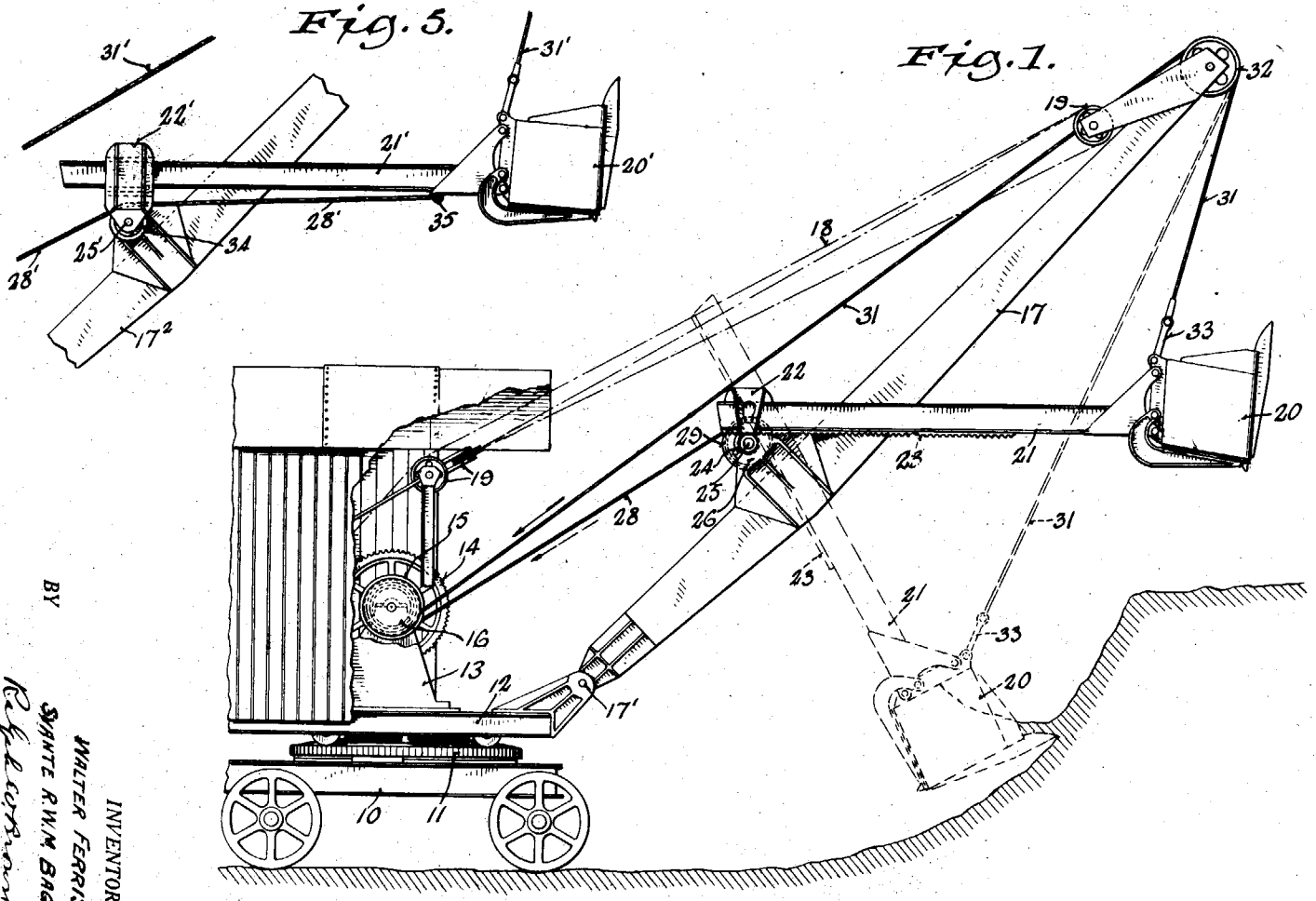
INVENTORS:
WALTER FERRIS
SVANTE R.W.M. BAGER
BY Ralph C. Brown
ATTORNEY.

Aug. 10, 1926. Re. 16,400
W. FERRIS ET AL
ROPE THRUSTING SHOVEL
Original Filed March 24, 1921 3 Sheets-Sheet 2
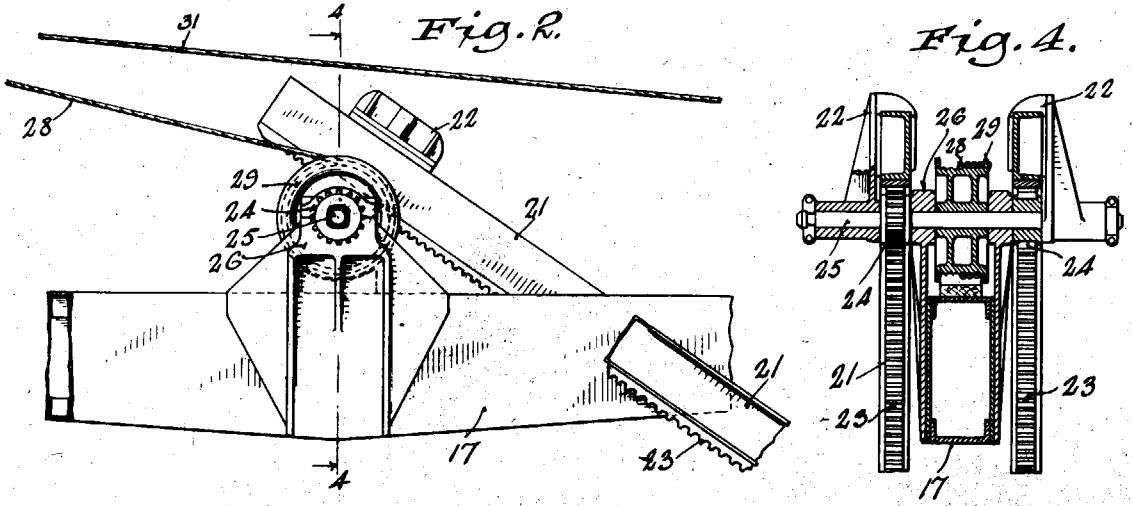
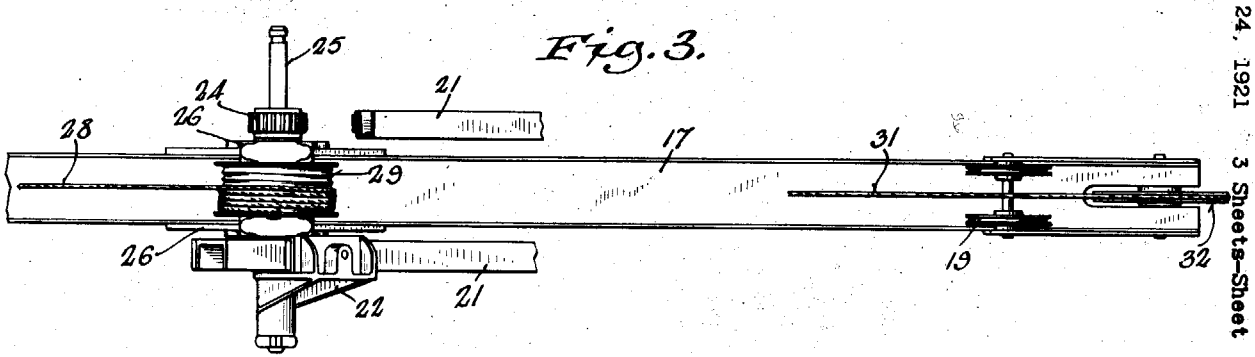
INVENTORS:
WALTER FERRIS AND
SVANTE R.W.M. BAGER
BY Ralph W. Brown.
ATTORNEY.

Aug. 10, 1926. Re. 16,400
W. FERRIS ET AL.
ROPE THRUSTING SHOVEL
Original Filed March 24, 1921 3 Sheets-Sheet 3
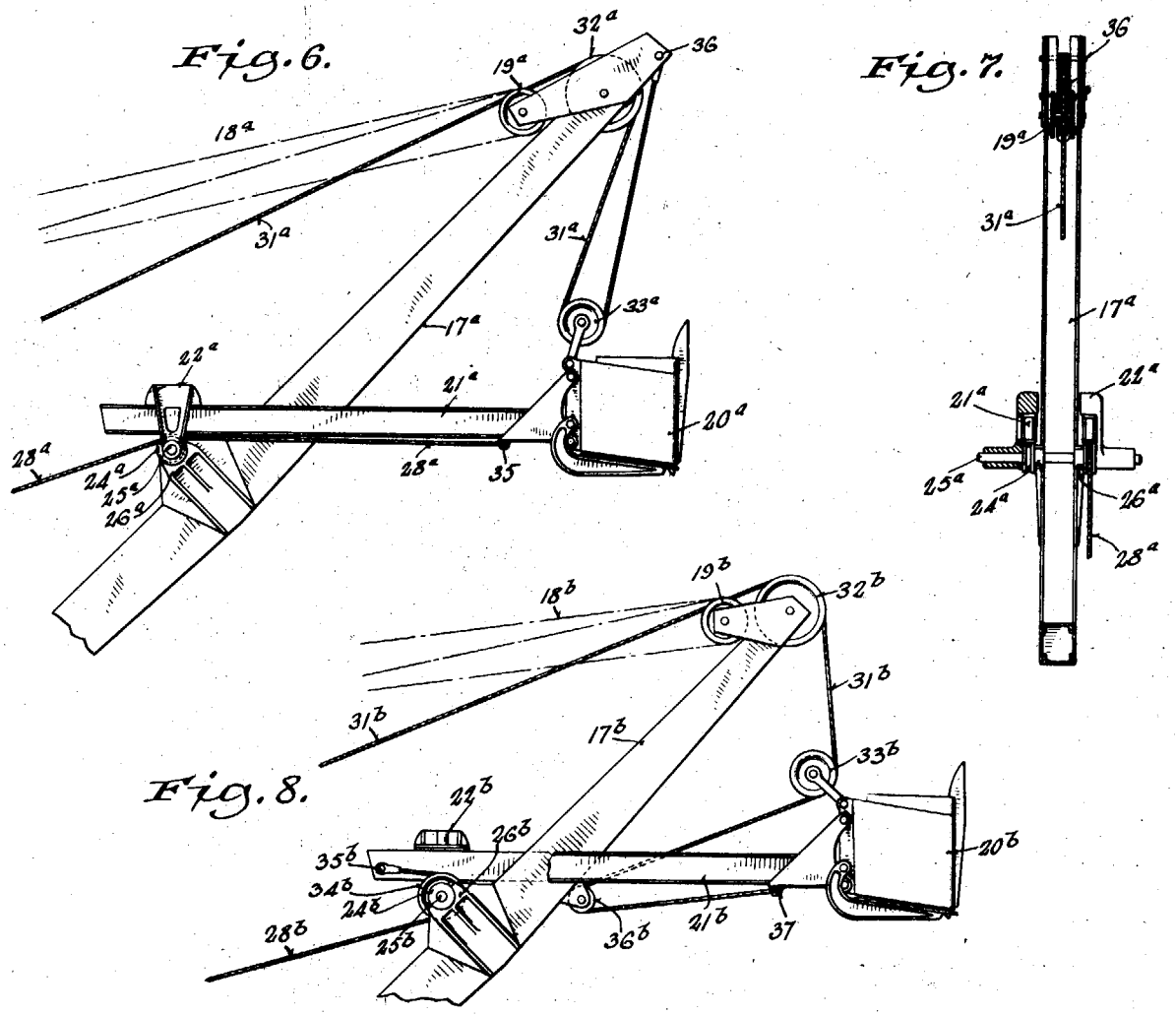
INVENTORS:
WALTER FERRIS AND
SVANTE R.W.M. BAGER
BY Ralph A. Brown
ATTORNEY.

Reissued Aug. 10, 1926. Re. 16.400

UNITED STATES PATENT OFFICE.

WALTER FERRIS, OF MILWAUKEE, AND SVANTE R. W. M. BAGER, OF SOUTH MILWAUKEE, WISCONSIN, ASSIGNORS TO BUCYRUS COMPANY, OF SOUTH MILWAUKEE, WISCONSIN, A CORPORATION OF WISCONSIN.

ROPE-THRUSTING SHOVEL.

Original No. 1,457,301, dated June 5, 1923, Serial No. 455,302, filed March 24, 1921. Application for reissue filed October 4, 1924. Serial No. 741,773.

This invention relates to power shovels, and more particularly, to shovels of that type in which power actuated devices are employed for effecting and controlling the shifting or thrusting action of the dipper handle.

The general aim of the present invention is to simplify and improve the construction and operation of devices of this character.

A more specific object is the provision of a simple and improved form of dipper thrusting device, capable of advantageous use in any type of power shovel irrespective of the character of prime mover with which the shovel may be provided.

Another object is the provision of an improved dipper thrust gear actuable from the main power unit and of such character that shifting of the dipper handle in either direction may be effected and nicely controlled without requiring the use of a reversing gear.

Another object is the provision of an improved dipper thrusting device in which a single cable associated with the power unit may be employed for effecting a shifting of the dipper handle independently of the hoisting action of the hoist gear.

Another object is the provision of an improved dipper thrusting device that may be operated and controlled from the hoisting and dragline drums, such as are ordinarily provided in certain types of power excavators.

Other objects and advantages will later appear.

Several embodiments of the invention are illustrated in the accompanying drawings, in which:

Figure 1 is a side elevation of a power shovel embodying the novel features of the present invention.

Figure 2 is a detail view on a larger scale of a portion of the dipper thrust gear shown in Figure 1.

Figure 3 is a bottom plan view of a portion of the boom and associated parts.

Figure 4 is a sectional view taken substantially along the line 4—4 of Figure 2.

Figure 5 is a fragmentary side elevation of a shovel of somewhat different form, embodying the novel features of the present invention.

Figure 6 is a fragmentary side elevation of another form of shovel constructed in accordance with the present invention.

Figure 7 is a fragmentary top view of the boom and associated parts employed in the shovel of Figure 6.

Figure 8 is a fregmentary side elevation of another form of shovel constructed in accordance with the present invention.

For convenience of explanation, the invention is shown and will be described as embodied in a power shovel having a longitudinally shiftable dipper handle, although it is applicable, with little or no modification, to shovels of that type in which the dipper handle is shiftable horizontally.

The shovel selected for illustration includes a wheeled truck 10, provided with a turntable 11, supporting a rotatable platform 12 in the usual manner. A hoisting winch 13 is mounted upon the platform 12. The hoisting winch is driven from any suitable prime mover (not shown) through an appropriate gearing, a portion of which is shown at 14. The hoisting winch includes a main drum 15 and an auxiliary drum 16, such, for instance, as are commonly employed as hoisting and dragline drums in some well known types of power excavators. These drums are mounted for independent rotation, each being independently actuated through the gearing 14, and each being controlled by individual clutch and brake mechanisms (not shown) of any standard or approved construction.

A boom 17 is pivotally mounted, as at 17′, upon the platform 12. A cable 18 and sheaves 19 are employed in the usual manner for adjustably supporting the boom in any desired position of inclination. The boom carries the usual dipper 20, and dipper handle 21, in such manner that the dipper handle is permitted both a swinging and shifting movement. In the shovel illustrated in Figure 1, the dipper handle is mounted for lengthwise movement in the pivoted saddle blocks 22, and is provided with the usual racks 23 for engagement with the gears 24 secured to the shipper shaft 25 rotatably mounted in fixed bearings 26 on the boom.

In order that the prime mover with which the shovel is provided may be utilized in effecting and controlling the shifting or thrusting of the dipper handle, the dipper handle is placed under the control of the auxiliary drum 16 hereinabove referred to. This may be accomplished in various ways, but in the present instance a cable 28 is employed for this purpose. One end of this cable is wrapped about and anchored upon the drum 16, while the other end is wrapped about and secured to the drum 29 keyed or otherwise fixed to the shipper shaft 25. The arrangement is such that, when this cable is drawn in under the action of the drum 16, the drum 29 and shipper shaft 25 are rotated and the dipper handle is thrust in one direction under the action of the gears 24 and racks 23. In the shovel illustrated in Figure 1, the cable 28 is wrapped about the drum 29 in such direction as to produce an inward thrust on the dipper handle when the cable is drawn in. In order to obtain absolute control over the dipper handle and to force the dipper handle in another direction when the cable 28 is paid out, provision is made for opposing the thrusting effect produced by the tension in this cable.

In this instance, the weight of the dipper and dipper handle is utilized for this purpose. The dipper is supported by a hoisting cable 31 having one end wrapped about and secured to the hoisting drum 15 in the usual manner. This cable passes over a sheave 32, preferably mounted adjacent the upper end of the boom 17, and is connected to the dipper as at 33. Since in the shovel shown in Figure 1, the cable 28 is arranged to produce an inward thrust on the dipper handle, the hoisting cable 31 and dipper and dipper handle are so arranged that the dipper handle is normally biased toward outward movement. It will be understood, of course, that when the dipper is in a lower position, such as assumed when digging, so that the dipper handle is inclined downwardly and outwardly the dipper handle tends to shift outwardly under its own weight and the weight of the dipper and contents. In order that this tendency may not be destroyed by the lifting action of the hoisting cable during a digging stroke, the hoisting cable is so arranged that the outward component of its pull, as compared with the vertical component, is materially greater than in ordinary practice. This may be accomplished in various ways, but in the shovel shown in this figure this is accomplished by employing a boom of a length greater than that ordinarily employed. In this instance, the boom 17 is of such length that the distance between the shipper shaft 25 and the outer end of the boom is considerably greater than the maximum distance between the shipper shaft 25 and connection 33. Thus during an entire digging stroke, the dipper is biased toward movement against the bank and against the tension in the cable 28.

The cable 31, under the action of the hoisting drum 15, performs the usual functions of raising and lowering the dipper and swinging the dipper handle 21 about the shipper shaft 25. In addition, however, the tension in this cable, together with the combined weight of the dipper and dipper handle, maintains an outward thrust upon the dipper handle in opposition to the tension in cable 28, so that when the drum 16 is released and the cable 28 paid out the dipper handle is shifted outwardly. Thus it will be seen that the dipper handle is always under the control of the drum 16, and that it may be shifted in either direction without requiring rotation of the drum 15. Furthermore, the dipper may be raised and lowered at will by the hoisting drum 15 in the usual manner.

To illustrate the operation of the shovel shown, assume that the dipper is in the lower digging position, as indicated by dotted lines in Figure 1, and that the drum 16 is held by its brake against rotation. Upon rotation of the hoisting drum 15 in a clockwise direction, the hoisting cable is drawn in, the dipper is raised, and the dipper handle is swung about the shipper shaft 25. As long as the drum 16 is held against rotation, the shipper shaft does not rotate and the dipper handle is held against outward shifting movement. If it is desired to obtain a bigger bite by forcing the dipper more firmly against the bank, this is accomplished by releasing the drum 16 so as to pay out the cable 28. This permits the shipper shaft 25 to rotate in a clockwise direction under the weight of the dipper and dipper handle so as to thrust the dipper handle outwardly. If, on the other hand, it is desired to reduce the bite by withdrawing the dipper from the bank, it is only necessary to rotate the drum 16 in a clockwise direction so as to draw in the cable 28. This action effects a rotation of the shipper shaft 25, against the influence of the weight of the dipper and dipper handle, in such direction as to thrust the dipper handle inwardly.

When the excavating movement has been completed and the dipper has been raised clear of the bank, the dipper may be readily shifted to its extreme outward position, such as might be required for dumping purposes, by merely releasing the drum 16. The inward inclination of that portion of the cable 31 adjacent the dipper connection 33 is sufficient to force the dipper handle outwardly to this extreme position when the drum 16 is released. To return to the dotted line position, it is only necessary to release the drum 15 so as to lower the dipper, and to rotate the drum 16 in a clockwise direction so as to shift the dipper handle inwardly to the position shown.

The shovel shown in Figure 5 is similar, in many respects, to that just described, except that no shipper shaft drum is required for controlling the shifting movement of the dipper handle. This shovel includes a boom $17^a$ similar to the boom above described and carrying a dipper 20′ and dipper handle 21′ for swinging and shifting movements. The dipper handle is slidably mounted in a saddle block 22′, pivotally supported as at 25′ upon the boom. The dipper is raised and lowered by means of the hoisting cable 31′ connected to the dipper as at 33′ in the manner above described. In this instance, however, the thrust controlling cable 28′ is connected at a fixed point 35 along the dipper handle and preferably adjacent the outer end thereof. This cable 28′ is preferably passed over a sheave 34 carried by the boom and secured to a thrust controlling drum (not shown) in a manner similar to that above described. The arrangement is such that the dipper and dipper handle cooperate with the hoisting cable 31′ in such manner as to be biased toward outward shifting movement and this movement is resisted by the tension in cable 28′. The operation of this shovel is similar to that above described in that the dipper may be raised and lowered in the usual manner under the action of the hoisting cable 31′. An outward thrust is produced by paying out the cable 28′ and an inward thrust by drawing in this cable.

The shovel shown in Figures 6 and 7 is similar, in many respects, to that of Figure 5. In this instance, however, the dipper handle $21^a$ is slidably supported by a pair of anti-friction rollers $24^a$, mounted upon a shaft $25^a$. The dipper handle is retained in position against the rollers $24^a$ by the usual pivoted saddle block $22^a$. A thrust controlling cable $28^a$, connected at one end to a thrust controlling drum (not shown), passes over one of the rollers $24^a$, which is preferably grooved for this purpose, and is connected at the other end to the forward end of the dipper handle $21^a$ as at 35. The dipper is supported by a hoisting cable $31^a$, which is connected to a hoisting drum (not shown), in the usual manner, and which is passed over a sheave $32^a$ mounted preferably adjacent the outer end of the boom $17^a$ and thence around a padlock sheave $33^a$ and finally returned and anchored to the boom as at 36. As in the shovels above described, the arrangement of the hoisting cable, dipper and dipper handle is such that the dipper and dipper handle are biased toward outward movement, this movement being controlled by the cable $28^a$. In operation, the dipper is raised and lowered in the usual manner by the hoisting cable $31^a$ and is shifted outwardly by paying out the cable $28^a$ and shifted inwardly by drawing in the cable $28^a$.

The shovel shown in Figure 8 is provided with a thrusting device in which the operation is the reversal of those hereinabove described. This shovel includes a boom $17^b$, which is preferably somewhat shorter than the boom employed in the shovels above described. The dipper handle $21^b$ rests upon a pair of anti-friction rollers $24^b$, rotatably mounted on a shaft $25^b$, the dipper handle being retained in engagement with the rollers by the usual pivoted saddle block $22^b$. In this instance, the thrust controlling cable $28^b$, which is connected at one end in the usual manner to a thrust controlling drum (not shown), is passed around a sheave $34^b$, preferably mounted on the shaft $25^b$ and freely rotatable with respect to the rollers $24^b$. The other end of the cable $28^b$ is secured to the inner end of the dipper handle $21^b$ as at $35^b$. By this arrangement, the tension in the cable $28^b$ tends at all times to force the dipper handle outwardly. The dipper is supported by a hoisting cable $31^b$ connected in the usual manner to a hoisting drum (not shown). This cable passes over the sheave $32^b$, preferably mounted adjacent the outer end of the boom, through a padlock sheave $33^b$ secured to the dipper, and thence back to the boom. This cable may be fixed to the boom or may be passed around a sheave $36^b$ fixed to the boom and then connected with the dipper as at 37. This cable is preferably connected with the boom at a point well down on the boom and preferably in the vicinity of the shaft $25^b$. Thus, it will be seen that the tension in that end of the cable $31^b$ between the padlock sheave $33^a$ and the boom tends at all times to shift the dipper handle inwardly.

In operation, the dipper is raised and lowered in the usual manner by drawing in or paying out the cable $31^b$. To shift the dipper handle outwardly, however, the cable $28^b$ is drawn in and to shift the dipper handle inwardly the cable $28^b$ is paid out, thus permitting the dipper handle to move inwardly under the influence of the tension in the end portion of the cable $31^b$ between the padlock sheave $33^b$ and boom.

Various changes may be made in the embodiments of the invention above described without departing from or sacrificing any of the advantages of the invention as defined in the following claims:

We claim:

1. A power shovel having: a boom; a sheave adjacent the outer end of said boom; a shaft permanently positioned on said boom intermediate its ends; a dipper handle, supported by said shaft for swinging and shifting movements; a hoisting cable passing over said sheave for swinging said handle; and associated with said handle, its entire association with said handle being independent of said shaft; said boom, shaft, handle and hoisting cable being so disposed that the net effect of the pull of the hoisting cable lengthwise on the dipper handle and the component (lengthwise of the dipper handle) of the pull of gravity on the dipper, contents and handle, shall, in all positions of the handle, tend to shift, and constitute the sole means for shifting, the handle outwardly, independently of whether the dipper is being raised or lowered; and means for controlling such shifting movement and for shifting said handle inwardly.

2. A power shovel having: a boom; a sheave adjacent the outer end of said boom; a dipper and dipper handle; a fixed support on said boom intermediate its ends, for supporting said dipper handle for swinging and shifting movements; a hoisting cable passing over said sheave and associated with said dipper and dipper handle, its entire association with said handle being independent of said support; said boom, support, dipper, dipper handle and hoisting cable being so disposed that the net effect of the pull of the hoisting cable lengthwise on the dipper handle and the component (lengthwise of the dipper handle) of the pull of gravity on the dipper, contents and handle, shall, in all positions of the handle, tend to shift, and constitute the sole means for shifting, the handle in one predetermined direction; and means for controlling said shifting movement and for shifting said dipper handle in the other direction.

3. A power shovel having: a boom; a sheave adjacent the outer end of said boom; a dipper and dipper handle; a fixed support on said boom intermediate its ends, for pivotally and slidably supporting said dipper handle; a hoisting cable, passing over said sheave and associated with said dipper and dipper handle, its entire association with said handle being independent of said support; said boom, support, dipper, dipper handle and hoisting cable being so disposed that the net effect of the pull of the hoisting cable lengthwise on the dipper handle and the component (lengthwise of the handle) of the pull of gravity on the dipper, contents and handle, shall, in all positions of the handle, tend to shift, and constitute the sole means for shifting, the handle outwardly; and a second line of cable associated with said dipper and dipper handle, for sliding said dipper handle inwardly.

4. In a power shovel, the combination of: a boom; a sheave adjacent the outer end of said boom; a dipper and dipper handle mounted at a fixed point on said boom intermediate its ends, for swinging and shifting movements; a hoisting cable passing over said sheave, whereby said dipper is raised and lowered, said hoisting cable having only fixed-point association with said dipper and dipper handle; said boom, dipper, dipper handle and cable being disposed in such manner that the net effect of the pull of the hoisting cable lengthwise on the dipper handle and the component (lengthwise of the dipper handle) of the pull of gravity on the dipper, contents and handle, shall, in all positions of the handle, tend to shift, and constitute the sole means for shifting, the handle outwardly; a separately operated cable; and a separate association between said last named cable and said dipper and dipper handle, whereby the handle is shifted inwardly.

5. A power shovel having: a boom; a sheave adjacent the outer end of said boom; a dipper and dipper handle mounted at a fixed point on said boom intermediate its ends, for swinging and shifting movements; a hoisting cable passing over said sheave and having only fixed-point association with said dipper and dipper handle; said boom, dipper, dipper handle and cable being disposed in such manner that the net effect of the pulls of the hoisting rope and of gravity on the dipper, contents and handle, maintains a thrust in one direction on said dipper handle, and constitutes the sole means for maintaining such thrust thereon, independently of the position of said dipper handle; and a second line of cable, associated with said dipper and dipper handle at only one point thereon, for controlling such thrusting movement and for shifting said handle in the other direction.

In witness whereof, I hereunto subscribe my name this 2nd day of October, 1924.

WALTER FERRIS.

In witness whereof, I hereunto subscribe my name this 24th day of September, 1924.

SVANTE R. W. M. BAGER.